May 21, 1957 S. E. M. NORLINDH 2,792,693
UNIVERSAL JOINT WITH SELF LUBRICATION
Original Filed Jan. 7, 1952 4 Sheets-Sheet 3
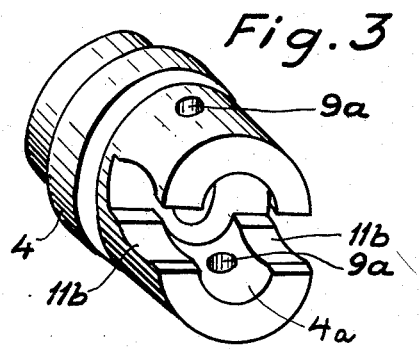
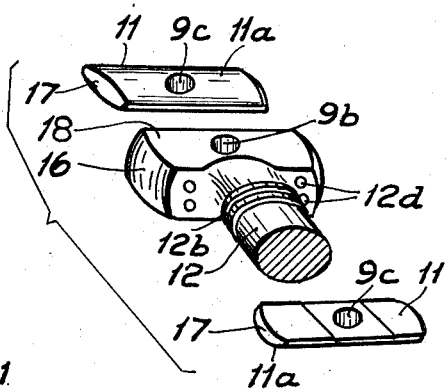
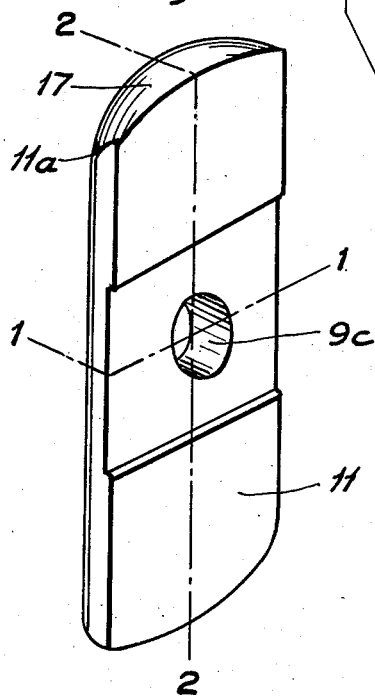
INVENTOR
Sven Erik Malte Norlindh
By Pierce, Scheffler & Parker
Attorneys

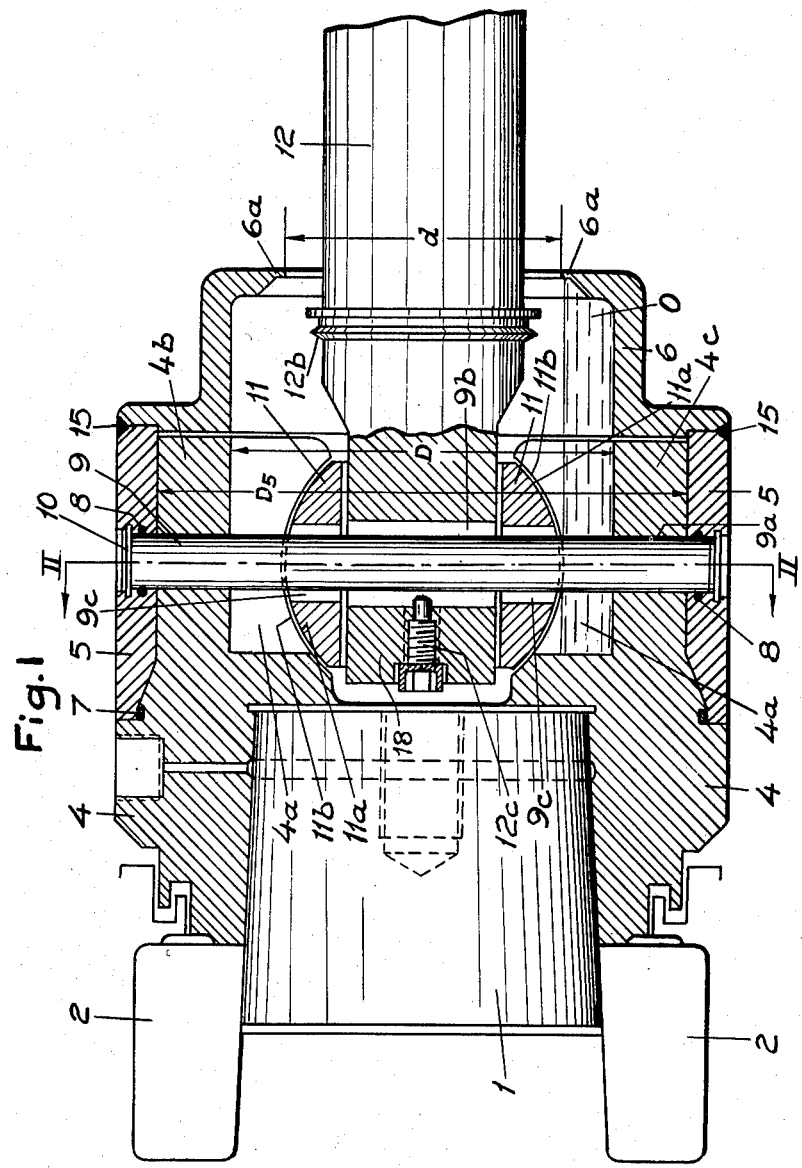

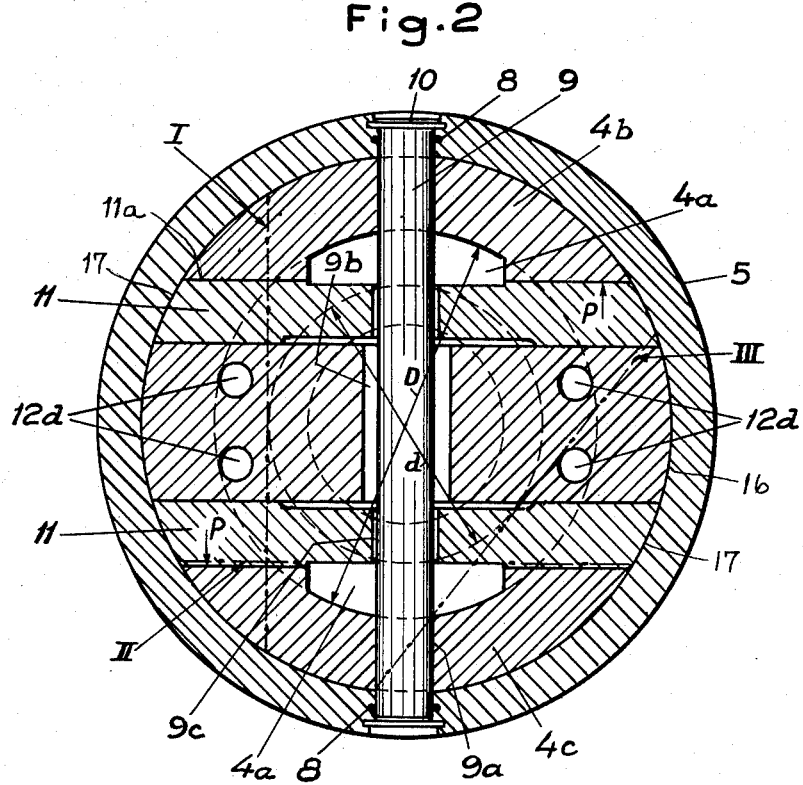

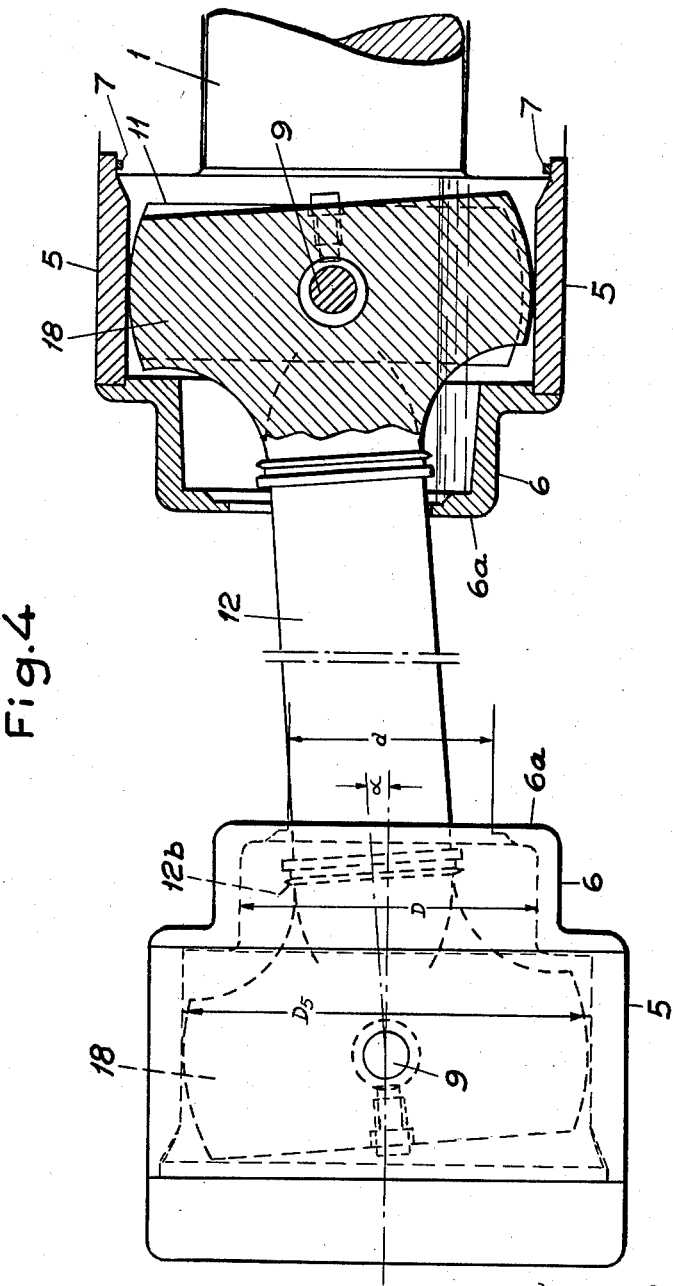

United States Patent Office 2,792,693
Patented May 21, 1957

2,792,693

UNIVERSAL JOINT WITH SELF LUBRICATION

Sven Erik Malte Norlindh, Morgardshammar, Sweden

Continuation of application Serial No. 265,216, January 7, 1952. This application August 5, 1955, Serial No. 527,057

Claims priority, application Sweden January 12, 1951

9 Claims. (Cl. 64—7)

The present invention relates to a universal joint type coupling provided with a self-lubrication device and comprising a coupling head for connecting the ends of two angularly movable transmission shafts or the like and preferably intended for rolling mills but it may also be used in other types of transmissions with axles or axle pivots journalled at different angles to each other. This application is a continuation of my application Serial No. 265,216, filed January 7, 1952, now abandoned.

In universal joints for transmission of torques between rolls in rolling mills it has for years been endeavoured to secure an adequate lubrication for said coupling, but no acceptable solution of the problem has been attained. The reason for this is probably due to the fact that the inventors in the past have assumed that universal joints of the said kind always have to be substantially hermetically closed by elements such as elastical metal shells, covers and sleeves of leather or India rubber and so on in order to prevent leakage of lubricant. However, many years experiences have proven that this arrangement is insufficient, unreliable and unsafe and also increases the costs of manufacture.

The present invention which has for its object to avoid these drawbacks will hereinafter be fully described, and particularly pointed out in the claims, reference being had to the accompanying drawings, which exemplify an embodiment of the invention to be used between two rolls in a rolling mill.

Fig. 1 shows the universal joint in longitudinal section.

Fig. 2 shows a cross section of the joint along the line II—II in Fig. 1.

Fig. 3 shows the coupling head separate in perspective and on a smaller scale.

On a smaller scale than that of Fig. 1, Fig. 4 shows two cooperating couplings, namely one on the left seen from above and one on the right also seen from above but intersected along the rotating axle of the coupling, and Figs. 5 and 6 show elements in perspective, the first one of said figures being drawn on the same scale as Figure 3 with the elements just taken out from the coupling head shown in Fig. 3.

The casing of the joint is composed of an outwardly circular coupling head 4 and two sleeves 5 and 6. The head is made as a container for a lubricant bath O. 1 designates a roll pivot and 2 a roller bearing for the pivot. The coupling head, which is clawshaped having two spaced and diametrically opposed arcuate jaws 4b, 4c at the end portion located on the opposite side of the roll pivot 1 (see Fig. 3), is fixed to the roll pivot. In the embodiment shown in Fig. 4 there is between the joints a universal spindle 12 having T-shaped end portions 18 (see also Fig. 5) which are journalled between sliding pieces 11 or the like, two at each end between jaws 4b and 4c and located at the outside of a circle represented by the diameter D and being limited outwardly by the shell 5. The sections of the pieces 11 shown in Figs. 1 and 2 are taken along planes indicated by the broken lines 1—1 and 2—2 of Fig. 6. The surfaces 11a of the sliding pieces which are turned away from each other, are cylindrically rounded and slide against corresponding surfaces 11b in the claws of the head. Thus the spindle can swing in one of two planes in relation to the coupling head. In the second angular plane the spindle swings round a central line which practically coincides with a bolt 9, and the holes 9a, 9b and 9c. Consequently the end surfaces 16, 17 of each T-portion 18 and each piece 11, respectively are more or less rounded such as spherical in order to be free from the sleeve 5 but at the same time be guided endwise of the same, compare Figs. 1 and 2. A play between the bolt 9 and the walls of the apertures 9a, 9b and 9c allows the movement of the spindle 12 around a centre line at a right angle to the bolt 9. Numerals 11a and 11b indicate sliding surfaces forming parts of a cylinder. The bolt is inserted straight through the head and the sleeve 5 and it serves to retain the sleeve in position. The bolt is barred by a spring security 10. The shape of the sliding pieces 11 appears clearly from Fig. 6 which shows one of them. The sleeve 5 is suitably, by welding or screw joints, united at 15 with the adjacent sleeve 6. Said sleeve is at its outer end provided with a flange 6a which forms a barrier for the lubricant to prevent it from flowing out of the coupling. The quantity of lubricant in the bath O must be so chosen that lubricant does not flow over the flange at its lowermost portion when the coupling is at rest. To make room for a sufficient quantity of lubricant in the coupling, the head 4 has oppositely disposed chambers 4a formed between the inner arcuate faces of the opposite jaws 4b, 4c and the outer faces 11a of the sliding pieces 11, which chambers are directly connected with the sleeve 6 so that the above-mentioned container is formed. Furthermore, the end portion of the spindle 12 has cavities 12d establishing an additional volume to the central chamber in order to secure a sufficient bath volume if the coupling is at rest in any of the positions I, II, III. The play outside the diameter D where the lubricant is deposited upon the rotation, is comparatively small, so that the sliding surfaces in the coupling are filled with lubricant as far in as possible towards the center. The volume of the lubricant bath O when the coupling is at rest, no matter in which position the coupling stops (e. g. the positions I, II or III indicated by the dash dot lines in Fig. 2), thus theoretically corresponds to the volume of the cavities outside the diameter D during rotation of the coupling, and the sliding surfaces become perfectly lubricated from the inner diameter D5 of the sleeve 5 up to the diameter D.

The sleeve 5 is mounted on the outer portion of the claw-shaped coupling head 4 which it encases entirely. Thus the head is reinforced against the forces developed by the torque which act in the direction of the arrows P (see Fig. 2).

When the universal joint is at rest, the lubricant bath assumes the position shown in Figs. 1 and 4. That is, lubricant fills the bottom portion of the sleeves 5, 6 up to the inner edge of the flange 6a. When the coupling is rotating, the lubricant is slung towards the circumference of the container and then penetrates into the play between movable portions of the coupling approximately outside the diameter D. More particularly, the lubricant flows outward and passes between the rubbing surfaces constituted by the inner faces of the sliding pieces 11, which contact the opposite faces of the T-shaped end portions 18 of the spindle 12, and by the outer faces 11a of the sliding pieces 11 which contact the transverse arcuate surfaces of the jaws 4b, 4c, and this condition obtains as long as the coupling is rotating. Loss of lubricant by continued outward movement induced by centrifugal force is prevented by the sleeve 5 and by the seals 7 and 8 and consequently the contacting surfaces remain under continuous lubrication while the joint rotates.

It has been established that the lubricant forms a film on all the surfaces even in the centre of the coupling provided it has a syrup-like consistency. Due to sealing rings or the like, for instance 7 and 8, the flange 6a and an offthrowing ring 12b, the latter being arranged to rotate with the spindle 12, the coupling is kept dry at the outside and the lubricant remains in the coupling both when it is rotating and resting, provided that water is prevented from being sprayed into the container.

When dismounting the universal joint, the spring security 10 and the bolt 9 are removed whereafter the sleeves 5 and 6 are pulled out. The two sliding pieces 11 are pushed out and the spindle 12 is removed and then the dismounting is effected.

In assembling, the above procedure is reversed. A screw 12c serves to prevent the spindle 12 from pushing against the coupling head 4 or the sleeve 6 axially when it rotates. Apertures 9a, 9b and 9c, Figs. 3, 5 and 6, are intended to receive the bolt 9.

The diameter d is determined by the largest angle of inclination α (Fig. 4) which the spindle 12 will assume in a given construction when the joint is functioning.

The details specified above can of course be varied considerably within the scope of the invention.

Having now described my invention, what I claim as new and desire to secure by Letters Patent is:

1. A self-lubricating universal joint for connecting the ends of first and second shafts comprising a coupling head having an internal chamber, and a pair of oppositely disposed and spaced jaws, a sleeve surrounding said jaws, said coupling head including means for connecting said head at one end thereof to the first of said shafts, the lower portion of said internal chamber when said head is at rest constituting a reservoir for lubricant, said head being provided at its other end with a comparatively small opening leading into said internal chamber and through which the end of said second shaft is adapted to be passed into the space between said jaws, universal connection means for securing the end of said second shaft to said head, said connection means including a bolt extending transversely through an opening in the end of said second shaft and through aligned openings in said jaws and sleeve, said opening through which the end of said second shaft is passed being defined by an inwardly extending peripheral flange which forms a barrier against leakage of lubricant from the lower reservoir portion of said internal chamber when said head is at rest, the level of the lubricant in the reservoir portion being normally below the lower edge of the flange, and said lubricant being distributed from said reservoir by centrifugal force to the various movable parts of said universal connection means when said head rotates.

2. A self-lubricating universal joint as defined in claim 1 wherein the universal connection means securing said head to the end of said second shaft includes two sliding pieces disposed on opposite sides of the end of said second shaft, and through which said bolt passes, said sliding pieces having convex surfaces slidably engaged with concave surfaces in the inner faces of said jaws and curvilinear end faces engaging the inner face of said ring.

3. A self-lubricating universal joint as defined in claim 1 wherein the end of said second shaft includes a ring surrounding said shaft and disposed inside the flange on said head, said ring forming during rotation of said universal joint a barrier against leakage of lubricant outwardly along said second shaft and internal chamber beyond said peripheral flange.

4. A self-lubricating universal joint as defined in claim 1 and which further includes a seal between said jaws and sleeve, and a second seal between said bolt and sleeve.

5. A self-lubricating universal joint as defined in claim 1 and which further includes spring security means cooperative with the end portion of said bolt for removably securing said bolt to said sleeve.

6. A self-lubricating universal joint as defined in claim 1 wherein the end of said second shaft entered in the chamber of said coupling head between said jaws is T-shaped and includes openings therethrough.

7. A self-lubricating universal joint for connecting the end of a first shaft and a T-shaped end of a second shaft comprising a claw-shaped coupling head having an internal chamber, said coupling head including means for connecting said head at one end thereof to the end of said first shaft, the lower portion of said internal chamber when said head is at rest constituting a reservoir for lubricant, said head being provided at its other end with a comparatively small end opening leading into said internal chamber and through which the T-shaped end of said second shaft is adapted to be passed, a sleeve surrounding said coupling head, the ends of the arm portions of said T-shaped end being convexly curved to contact the inner circumference of said sleeve, universal connection means securing the T-shaped end of said second shaft to said head, a pair of sliding members disposed on opposite faces of said T-shaped end and being convexly curved at their outer sides for slidable engagement with complementary concave surfaces provided in said head and convexly curved at their ends for engagement with the inner circumference of said sleeve, the said end opening in said head being defined by an inwardly extending peripheral flange which forms a barrier against leakage of lubricant from the lower reservoir portion of said internal chamber when said head is at rest, the level of lubricant in said reservoir portion being normally below the lower edge of said flange and said lubricant being distributed from said reservoir by centrifugal force to the various movable parts of said universal connection means when said head rotates.

8. A self-lubricating joint as defined in claim 7 wherein the arm portions of said T-shaped end of said second shaft include cavities therein for lubricant and said claw-shaped coupling head also includes cavities therein at both sides of said T-shaped shaft end for lubricant.

9. A self-lubricating universal joint for connecting the ends of first and second shafts comprising a hollow coupling head having an internal chamber, said coupling head including means for fixing said head at one end thereof to the end of said first shaft, a first shell surrounding said head, the lower portion of said internal chamber, when said head is at rest, constituting a reservoir for lubricant, said head being provided at its other end with a comparatively small opening leading into the chamber in said head and through which the end of said second shaft is adapted to be passed, said opening being defined by a peripheral flange extending inward toward the surface of said second shaft which forms a barrier against leakage of lubricant, universal connecting means securing the end of said second shaft to said head and provided with surfaces rubbing against each other, said head including cavities communicating with said internal chamber, substantially including said rubbing surfaces, and being limited outwardly by said first shell, said flange being fixed to a second shell-like element constituting an elongation of said head and enlarging said internal chamber and reservoir and having a smaller internal diameter than said first shell, the lubricant being distributed from said internal chamber to said cavities by centrifugal force when said coupling is rotating and the volume of the reservoir as defined by said flange corresponding to the total volume of said cavities.

References Cited in the file of this patent
UNITED STATES PATENTS

| | | |
|---|---|---|
| 1,044,734 | Blood | Nov. 19, 1912 |
| 1,232,829 | Moore | July 10, 1917 |